(12) United States Patent
Spirin et al.

(10) Patent No.: US 6,795,599 B2
(45) Date of Patent: Sep. 21, 2004

(54) DIFFERENTIAL FIBER OPTICAL SENSOR WITH INTERFERENCE ENERGY ANALYZER

(76) Inventors: Vasilii V. Spirin, Esteban Cantu, N 103, Col. Empleados, Ensenada, Baja California (MX), 22860; Mikhail G. Shlyagin, Bahia Vizcalno # 129, Col. Moderna, Ensenada, Baja California (MX), 22860; Eric Udd, 2555 NE. 205th Ave., Fairview, OR (US) 97024

( * ) Notice: Subject to any disclaimer, the term of this patent is extended or adjusted under 35 U.S.C. 154(b) by 101 days.

(21) Appl. No.: 10/128,847

(22) Filed: Apr. 24, 2002

(65) Prior Publication Data

US 2002/0176647 A1 Nov. 28, 2002

Related U.S. Application Data

(60) Provisional application No. 60/290,450, filed on May 11, 2001.

(51) Int. Cl.[7] .................................................. G02B 6/00
(52) U.S. Cl. .............................. 385/12; 385/15; 385/31; 385/37
(58) Field of Search .............................. 385/12, 15, 31, 385/37

(56) References Cited

U.S. PATENT DOCUMENTS

| | | | |
|---|---|---|---|
| 5,591,965 A | | 1/1997 | Udd |
| 5,828,059 A | | 10/1998 | Udd |
| 5,869,835 A | | 2/1999 | Udd |
| 6,201,912 B1 | * | 3/2001 | Kempen et al. ............... 385/37 |
| 6,337,737 B1 | * | 1/2002 | Chang et al. .................. 356/32 |
| 6,363,180 B1 | | 3/2002 | Yamate et al. |
| 2002/0028034 A1 | * | 3/2002 | Chen et al. ................... 385/12 |

OTHER PUBLICATIONS

N.G. Xu, H. Geiger and J.P. Dakin "Multiplexed Point and Stepwise—continuous Fibre Grating Based Sensors: Practical Sensors for Structural Monitoring!" SPIE vol. 2294 p. 69, 1994.

* cited by examiner

*Primary Examiner*—Rodney Bovernick
*Assistant Examiner*—Sung Pak

(57) ABSTRACT

A fiber optic sensor, which includes an interference energy analyzer, is used to measure strain and temperature distribution along a test fiber. The sensor includes the following: a plurality of double-Bragg grating elements positioned along a test fiber, a broadband light source which produces a broadband spectral profile that propagates along the test fiber, an optical filter that is able to change the parameters of the broadband spectral profile, an optical reflection detector, a fiber optic beamsplitter, and an interference energy analyzer. Each double-Bragg grating element consists of two weak Bragg gratings, separated by a distance unique to each element. The interference energy analyzer calculates the energies of the interference patterns, which are created by beams reflected from double-Bragg grating elements. The energy of the interference signal changes when the gratings in one element non-uniformly change its parameters due to non-equal temperature or strain influence on two gratings.

20 Claims, 16 Drawing Sheets

DIFFERENTIAL FIBER OPTICAL SENSOR WITH INTERFERENCE ENERGY ANALYZER

This application claims the benefit of U.S. Provisional Application No. 60/290,450 by Vasilii V. Spirin, Mikhail C. Shlyagin and Eric Udd, entitled "Differential Fiber Sensor with Interference Energy Analizer" which was filed on May 11, 2001.

BACKGROUND OF THE INVENTION

This invention relates to fiber optical sensors and, more particularly, to fiber Bragg grating sensors used to measure temperature and strain changes. An area that has been investigated closely is the measurement of longitudinal strain and temperature. M. Xu, H. Gieger and J. P. Dakin in "Multiplexed Point and Stepwise Continuous Fiber Grating Based Sensors: Practical Sensor for Structural Monitoring?", Proceedings of SPIE, Vol. 2294, p. 94, 1994 described the usage of dual overlaid fiber gratings to measure strain and temperature. The major difficulty with this approach is that to obtain reasonable accuracy the wavelengths must be widely separated. Fiber etalon based strain sensors based on air cavities that are sold commercially by FISO and Luna offer relative immunity to temperature sensitivity but are difficult to multiplex into a single fiber line.

Fiber grating systems are needed that can measure either temperature or strain independently that can be easily multiplexed along a single fiber line without cross sensitivity.

BRIEF DESCRIPTION OF THE PRESENT INVENTION

In the present invention fiber grating strain and temperature sensors are described that are designed to measure only strain or only temperature eliminating the need for compensation. This is accomplished by using a fiber optic sensor, which includes an interference energy analyzer and a series of double Bragg grating elements that are used to measure strain and temperature distribution along an optical fiber. Each double-Bragg grating element consists of two Bragg gratings, separated by a distance unique to each element. The interference energy analyzer calculates the energies of the interference patterns, which are created by beams reflected from double-Bragg grating elements. The energy of the interference signal changes when the gratings in one element non-uniformly change its parameters due to non-equal temperature or strain influence on two gratings. This is accomplished by formed matched pairs of fiber gratings that act as etalons and isolating one of the fiber gratings from strain or temperature. By writing gratings into birefringent fiber and forming matched pairs it is also possible to monitor transverse strain and offset temperature effects. By converting the interaction of moisture or chemical species into strain on the fiber gratings these parameters may also be measured while compensating for temperature effects on the fiber gratings.

Therefore, it is an object of the invention measure strain and temperature using fiber grating sensors with reduced cross sensitivity.

Another object of the invention is to allow transverse strain measurement with reduced temperature sensitivity.

Another object of the invention is to provide a means to measure moisture or chemical content of the environment with reduced temperature sensitivity.

DETAILED DESCRIPTION OF THE SHOWN EMBODIMENTS

Figure 1:
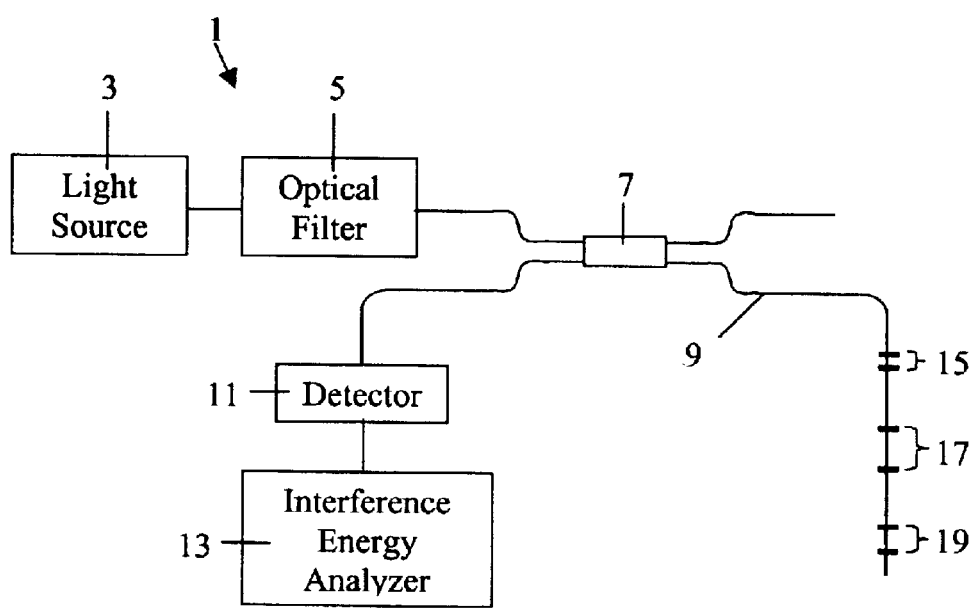
FIG. 1 is a schematic representation illustrating the basic embodiment of a differential fiber optic sensor with interference energy analyzer constructed in accordance with the present invention.

Referring to FIG. 1, the present invention comprises a differential fiber optic sensor system 1. This system includes a broadband light source 3 that directs a broadband spectral profile through both an optical filter 5 and an optical coupler 7, and into a test fiber 9 that contains a number of double-Bragg grating elements 15, 17, and 19. The light source 3 is operable to generate a broadband light radiation with the spectral width that exceeds or equals to a measurement wavelength range. The optical filter 5 could be a commercially available fiber Fabry-Perot tunable filter with an electrically controlled air gap. The transmission of the optical filter is characterized by a central transmission wavelength $\lambda$, which changes inside a particular wavelength range, and the transmission spectral width $\Delta\lambda$. The transmission spectral width satisfy following expression:

$$\Delta\lambda < \frac{\lambda^2}{l^g_{max}}, \tag{1}$$

where $l^g_{max}$ is maximum distance between two gratings in a double-Bragg grating element.

This relationship (1) means that if broadband radiation passes through the optical filter 5, the output radiation will have a coherence length that exceeds the distance between the Bragg gratings in any one double-Bragg grating element 15, 17, 19. It must be stressed, however, that from a practical point of view this coherence length should be less than a minimum distance l* between any two Bragg gratings which does not consider as double-Bragg grating element. It means that interference patterns should be created only by two beams reflected from two gratings that are pertain to any one double-Bragg grating element. But no interference effect can appear due to reflections from far-separated gratings (which are separated on distance that exceeds l*) and does not pertain to any one double-Bragg grating element, Standard single mode optical fiber can be used as the test fiber 9. The light that is transmitted through the optical coupler 7 propagates along the test fiber 9 and is partially reflected back by the plurality of double-Bragg grating elements 15, 17, 19, which are positioned along the test fiber 9. The Bragg gratings 15, 17, 19 have nearly the same Bragg wavelength, this means that the reflection spectra of the gratings overlap. Any double-Bragg grating element 15, 17, or 19 consists of two weak Bragg gratings, separated by a distance unique to each element. The reflection detector 11 senses the change in the intensity of the reflected light from test fiber 9. The reflection detector 11 is electrically connected to an interference energy analyzer 13. The analyzer 13 calculates the energies of the interference pattern for each double-Bragg grating element separately. The interference patterns are created by the beams reflected from two Bragg gratings of any double-Bragg grating element 15, 17 and 19 with the change of central transmission wavelength $\lambda$ of the optical filter 5.

Lets consider the operating principle of the interference energy analyzer 13 for the case where the differential optical sensor comprises of one double-Bragg grating element. The reflection spectrum $R_{12}(\lambda)$ of double structure with two different weak gratings is defined as:

$$R_{12}(\lambda)=|r_{12}(\lambda)|^2=|r_1(\lambda)+r_2(\lambda)\exp(-i4\pi nL_{FP}/\lambda)|^2==|r_1(\lambda)|^2+|r_2(\lambda)|^2+2|r_1(\lambda)r_2(\lambda)|\cos[(4\pi nL_{FP}/\lambda)+\phi(\lambda)], \tag{2}$$

where $r_{12}$ is the complex reflectivity of double grating structure, n is the effective index of the core, $r_1$ and $r_2$, are the complex reflectivities of the first and second gratings, respectively, which can be found from the mode-coupled equations, $\phi(\lambda)$ is the phase difference of complex reflectivities of gratings, and $\lambda$ is central transmission wavelength of the optical filter.

Two Bragg gratings in one element act as weak mirrors in a low finesse Fabry-Perot interferometer. As it follows from Equation (2) the interference produced by two beams reflected from two gratings appears as sinusoidal modulation in the reflection spectrum in the wavelength range where spectra of both gratings overlap with each other. The distance $L_{FP}$ between two gratings defines the value of the modulation frequency.

The basic idea of the differential double-Bragg grating sensor is to measure the energy of the oscillating term in the reflection spectrum of the double Bragg grating structure. The energy of the sinusoidal modulation $E_{AC}$ is defined as:

$$E_{AC}=\int\{2|r_1(\lambda)r_2(\lambda)|\cos[(4\pi nL_{FP}/\lambda)+\phi(\lambda)]\}^2 d\lambda, \tag{3}$$

The maximum energy of the sinusoidal modulation for the identical gratings is reached when the spectral peaks of two gratings completely coincide; the energy becomes zero when the spectral peaks do not overlap. The energy of the interference signal changes when the gratings non-uniformly change parameters due to unequal temperature or strain influence on the two gratings. However, if temperature or strain has an equal effect on both gratings, the energy of the interference component does not change. Therefore, the differential double Bragg grating sensor, in basic embodiment, is sensitive to the strain or temperature spatial gradient, but it is free from spatially uniform temperature and strain influences.

The energy of the interference component can be calculated from the Fourier transform of the reflection spectrum. Indeed, taking into account the Parseval's Theorem that connects the signal energy with its Fourier pattern energy:

$$\sum_{n=0}^{N-1}|R_{12}(\lambda_n)|^2=\sum_{k=0}^{N-1}|c_k|^2, \tag{4}$$

where N is a number of measured spectrum samples at wavelength $\lambda_n$, and $c_k$ is the Fourier transform coefficients of reflectivity function $R_{12}$. The parameter $c_k$ can be calculated:

$$c_k=\frac{1}{\sqrt{N}}\sum_{n=0}^{N-1}R_{12}(\lambda_n)e^{-2\pi i n k/N}, \tag{5}$$

The normalized energy $E^N_{AC}$ of the interference component summarizing the squares of the amplitudes of Fourier components of the interference pattern around central modulation frequency $k_0$ can be calculated:

$$E^N_{AC}=\sum_{k=k_0-\Delta k}^{k_0+\Delta k}|c_k|^2\bigg/\sum_{k=0}^{N/2-1}|c_k|^2, \tag{6}$$

where $2\Delta k$ is the width of summarizing interval which should slightly exceed the width of the signal peak, and (N/2−1) is the length of the half of the Fourier image of the signal.

According to Equation 6, in order to calculate the interference energy of one double-Bragg grating element 15, 17 or 19 the analyzer 13 should sum the squares of amplitudes of Fourier components of the interference pattern around the central modulation frequency $k_0$. The value of the central modulation frequency $k_0$ is defined by the distance $L_{FP}$ between two gratings in a double-Bragg grating element 15, 17, and 19. In the current invention, all double-Bragg grating elements 15, 17, and 19 are separated by unique distances, and therefore have different central modulation frequencies $k_{0m}$, where "m" is the identifying number of the current element. In order to calculate the interference energies of all double-Bragg grating elements 15, 17, and 19, the analyzer 13 should sum the squares of amplitudes of Fourier components of the interference pattern around all central modulation frequencies $k_{0m}$, separately for every "m".

Note, that the interference energy of double-Bragg grating element 15, 17 or 19 can also be found using an electronic spectroanalyzer, which integrates the spectral intensity of a modulated signal at a range that corresponds to the modulation frequency of examined element.

Figure 2:
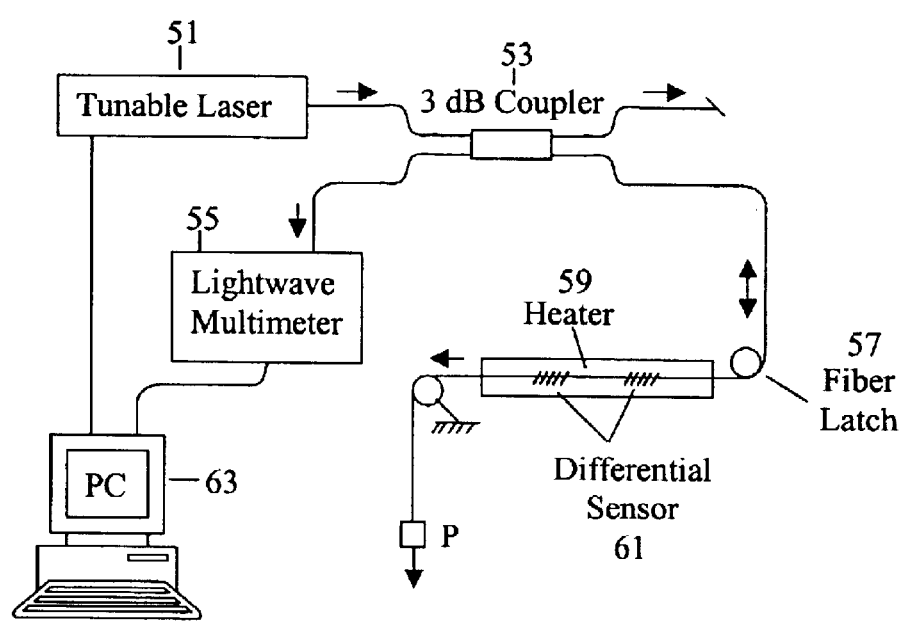
FIG. 2 is a schematic representation of an experimental embodiment of the current invention for temperature-insensitive strain measurement.

An embodiment of the current invention for temperature-insensitive strain measurements with one double-Bragg grating element 61 is shown in FIG. 2. A tunable diode laser 51, scanning within the wavelength interval 1534–1538 nm directs light through a 3 dB coupler 53 and to a differential sensor 61. A lightwave multi-meter was utilized to measure the reflected light intensity. A computer 63 was used to control the wavelength scanning of the laser 51 and for data acquisition. In order to change the temperature, both the gratings were placed inside an electrical heater 59, where they were equally heated. Fiber latch 57 was used to fix the fiber in a point between heater 59 and 3 dB coupler 53. The spectrum recording was performed with a wavelength resolution of 0.01 nm.

Figure 3:
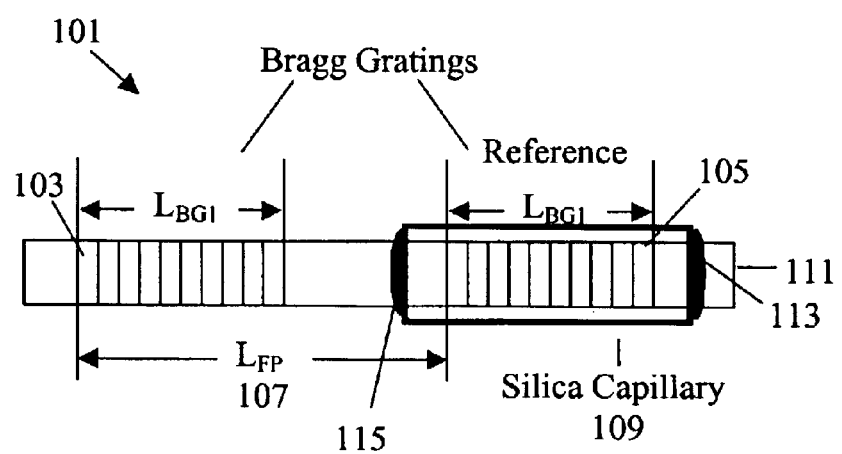
FIG. 3 shows a configuration of the differential double Bragg grating sensor for temperature-insensitive strain measurement

The configuration of the differential double Bragg grating sensor 101 for temperature-insensitive strain measurement is shown in FIG. 3. The sensor consists of two identical measuring 103 and reference 105 gratings with the reflectivity of 2% separated by distance $L_{FP}$=3 cm 107. The reference grating 105 is placed inside the silica capillary 109, which has the same thermal expansion coefficient as the fiber 111. The capillary 109 is glued by the epoxy 113 and 115 to the fiber at two points. As a result, the reference grating 105 is virtually insensitive to strain. The Bragg gratings 103 and 105 have been written in the core of the single-mode fiber 111 by using a phase mask technique and fourth harmonic of Q-switched Nd:YAG laser. The gratings 103 and 105 both had a length about 1 mm each, and a reflectivity of 2%. In order to change the temperature, both gratings 103 and 105 were placed inside the heater where they are heated equally. In the experiment different loads were attached to the fiber in order to induce the strain; strain was defined as:

$$\varepsilon = \frac{P}{Es} \quad (7)$$

where P is applied force, E is Young's modulus of glass, and s is the fiber cross-section.

Figure 4:
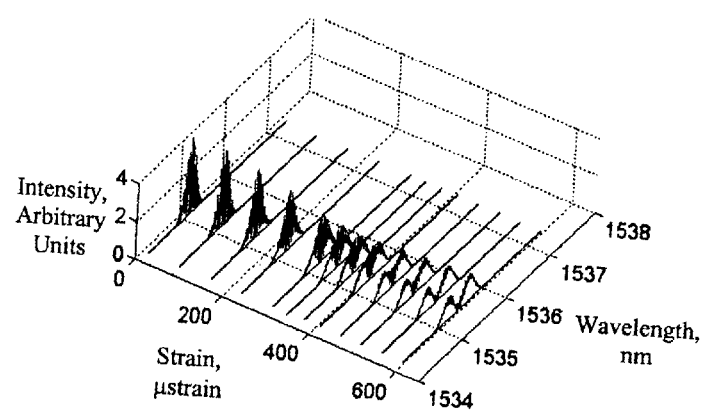
FIG. 4 shows the evolution of the reflection spectrum of differential structure with the strain.

The strain of the double structure under study leads to the effective refractive index and pitch mismatch between two gratings, which produce different central wavelength shifts of these gratings. FIG. 4 shows the evolution of the reflection spectrum of differential structure with the strain. The temperature difference ΔT between two gratings is equal to zero in the experiment. When the strain value is small, the reflection spectra of both gratings completely coincide; this leads to a strong modulation of the resulting spectrum. With increasing strain, the reflection spectra of the measuring and reference gratings separate, since only the measuring grating is strained when a load is applied. The modulation signal almost disappears when the reflection spectra of two gratings are completely separated.

Figure 5:
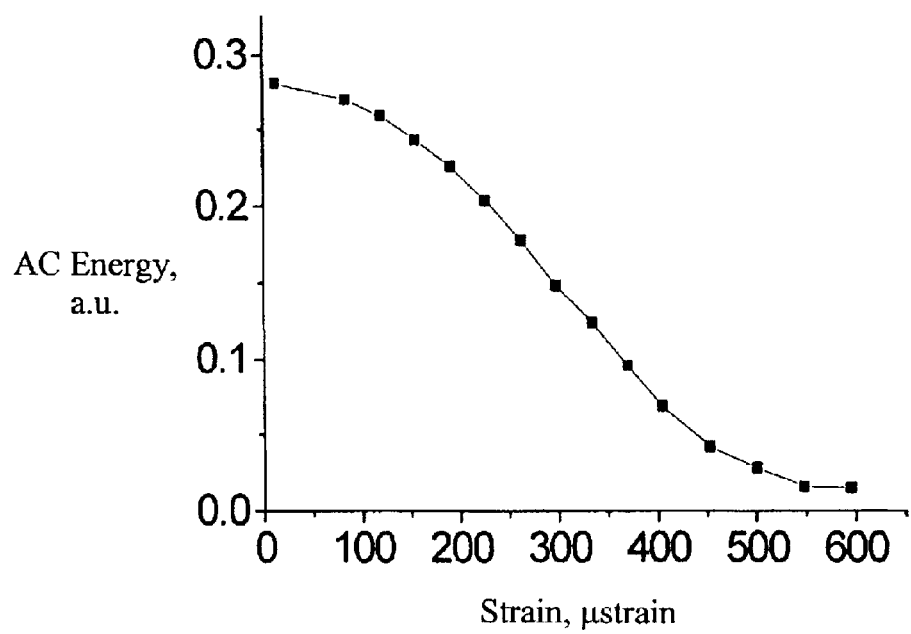
FIG. 5 shows the dependence of normalized energy of the modulation signal on strain for embodiment of the present invention presented in FIG. 3

The decrease in normalized energy of the modulation signal with increasing strain is shown in FIG. 5. This energy strongly depends on strain but does not change with temperature variations because of the equal thermal expansion of both gratings.

Figure 6:
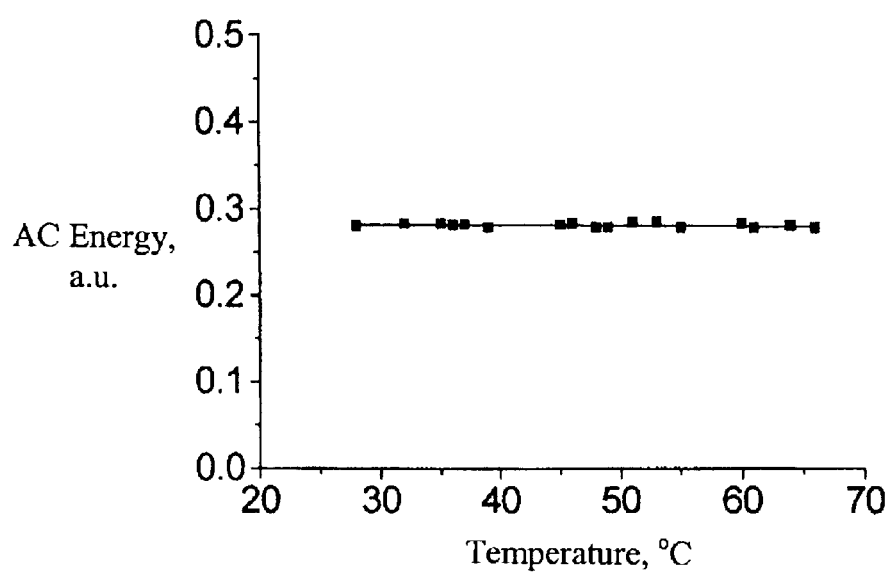
FIG. 6 shows the dependence of normalized energy of the interference term on the temperature for embodiment of the present invention presented in FIG. 3.

FIG. 6 shows the dependence of normalized energy of the interference term on the temperature for the differential structure placed inside the heater without strain ($\epsilon$=0). The measured variation in interference signal energy does not exceed ±1%. Thus, the proposed technique allows strain measurement free from temperature influence.

Figure 7:
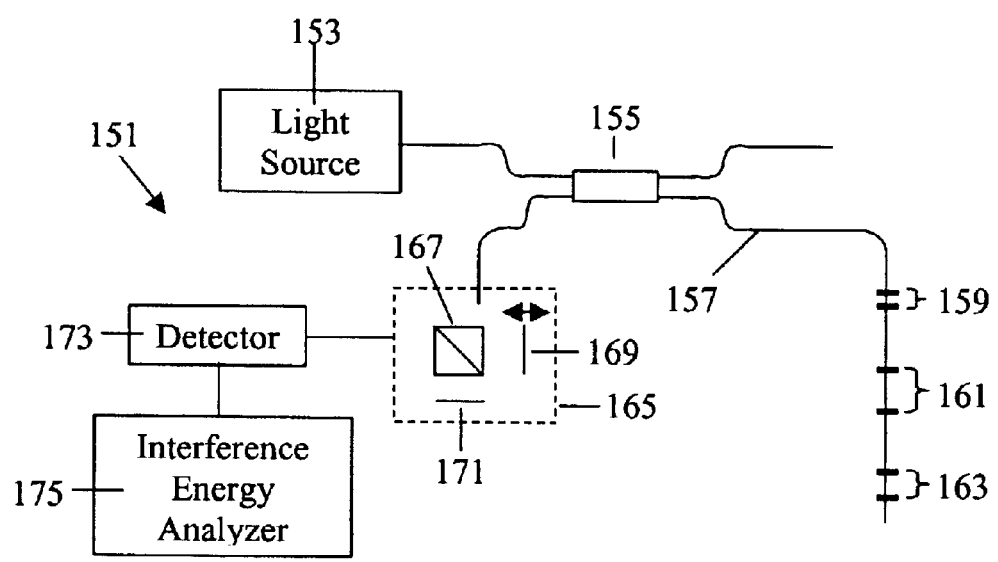
FIG. 7 shows the embodiment of invention with optical filter comprises an unbalanced Michelson interferometer.

FIG. 7 shows the embodiment of invention 151 with an optical filter comprising of an unbalanced Michelson interferometer 165, which consists of a beamsplitter 167, moving 169, and stationary 171 mirrors. This system includes a broadband light source 153 that directs a broadband spectral profile through both an optical coupler 155, and into a test fiber 157 that contains a number of double-Bragg grating elements 159, 161, and 163. The spectral peaks reflected from the double-Bragg grating elements 159, 161, and 163 travel back through the coupler 155 and into a Michelson interferometer 165. The Michelson interferometer 165 is placed between the second port of beamsplitter 155 and the reflection detector 173. The optical path difference between the two arms of interferometer 165 can change by using the moving mirror 169, which is installed in one arm of the interferometer 165. The optical path difference can change from a value which is less than the minimum optical distance between two gratings in one double-Bragg grating element 159, 161, and 163, $l^g_{min}$ (see FIG. 8), to a value that exceeds the maximum distance between two gratings in double-Bragg grating element, $l^g_{max}$. When the optical path difference between the two legs of the interferometer 165 is zero, there is no interference pattern due to the reflection from the Bragg gratings 159 161, 163, because a broadband light source 153 is used. Interference patterns appear only when the optical path difference, Δd, between the two arms of the interferometer 165 is approximately equal to the optical distance between the two gratings that form a double-Bragg grating element 159, 161, and 163.

Figure 8:
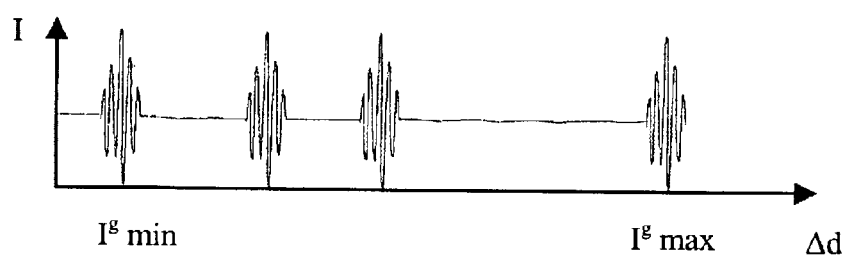
FIG. 8 shows the dependence of the intensity of the reflected light on optical length difference $\Delta d$ between two arms of the interferometer for embodiment of the present invention presented in FIG. 7.

The interference produced by two beams reflected from two gratings appears as sinusoidal modulation in the dependence of reflected intensity on optical length difference only if spectra of both gratings overlap with each other, this is shown in FIG. 8. The interference energy analyzer 175 calculates the intensity of the interference patterns, separately for each double-Bragg grating element 159, 161 and 163. In this embodiment, interference patterns are created by beams reflected from double-Bragg grating elements 159, 161, and 163 with the change of optical length difference between two arms of Michelson interferometer 165.

Figure 9:
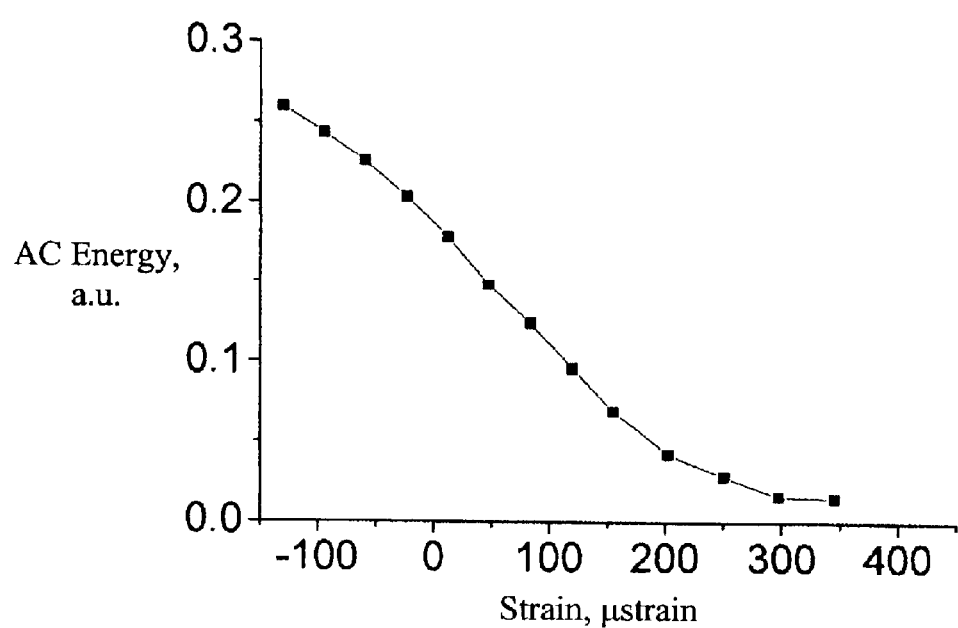
FIG. 9 shows the dependence of the normalized energy of the interference term versus strain for embodiment of current invention providing temperature-insensitive strain measurement with linearized sensor response.

As is mentioned above, FIG. 4 presents the dependence of the normalized energy of the interference term versus strain, for the embodiment of the current invention providing temperature-insensitive strain measurements. Qualitatively the same shape of this dependence of normalized energy versus strain or temperature can be obtained for other differential sensor embodiments. In all cases, the initial part of these dependencies shows significant nonlinearity. Moreover, due to the symmetrical shape of these dependencies, it is impossible to recognize the sign of the change. In order to linearize the sensor response and overcome the sign ambiguity of measurand, the Bragg wavelength of one grating from each double-Bragg grating elements can be shifted in respect to another one, so as the start point of the measurement is placed in the center of the linear part of the dependence of energy of the interference pattern versus measurand. This shift can be producing during the Bragg grating imprinting process or achieved by initially straining one of the gratings. FIG. 9 shows the dependence of the normalized energy of the interference term versus strain for the embodiment of the current invention, which provides temperature-insensitive strain measurement with linearized sensor response. In this embodiment, the grating that is placed inside the silica capillary is preliminary strained by 250 $\mu$strain before it was glued by the epoxy. Preliminary strained differential sensors show a greater linear response inside the interval (−100 $\mu$strain, +100 $\mu$strain) and the sign of the influence can be determined with this embodiment (see FIG. 9).

Figure 10:
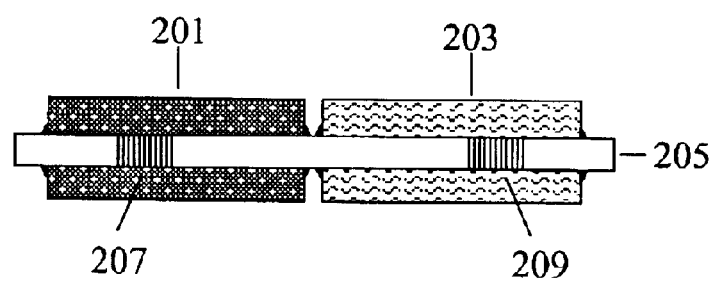
FIG. 10 presents the embodiment of differential fiber optical sensor for the measurement of the absolute temperature with two bulk samples.

The current invention allows not only the ability to find the strain gradient or temperature, but also to measure its absolute values. FIG. 10 presents the next embodiment of a differential fiber optical sensor for the measurement of the absolute temperature. In this embodiment, two Bragg gratings 207 and 209 from each double-Bragg grating elements are mechanically coupled to two bulk samples 201 and 203 with different thermal expansion coefficients, correspondingly. This attachment was done, for example, at a temperature equal to $T_0$, for initially identical gratings 207 and 209 in a double-Bragg grating element. In order to linearize the sensor response and overcome the sign ambiguity of the measurand, one grating 207 or 209 from every element is strained during its the coupling to a bulk sample. The change in temperature of the double structure under study produces a different central wavelength shift for each grating. This change, leads to a change in the normalized energy of the modulation signal, which is calculated by the analyzer 175, seen in FIG. 7. As a result, the temperature difference from $T_0$, and therefore, the absolute value of the temperature, can be measured with the current invention. Moreover, if the two bulk samples 201 and 203 have the same strain-response under applied longitudinal force, an absolute temperature measurement free from the strain influence is achieved. For example, the bulk samples 201 and 203 can be made from different materials, and have different cross sections, so as, the difference in their Young's modules is compensated by the difference in cross sections.

Figure 11:
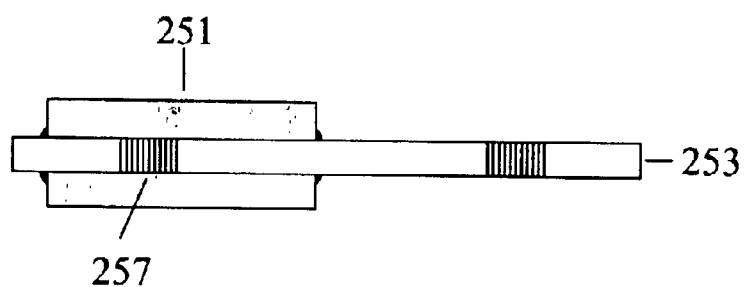
FIG. 11 presents the embodiment of differential fiber optical sensor for the measurement of the absolute temperature with one bulk sample.

Note, that with current invention, the measurement of the absolute temperature is also possible in the case where only one bulk sample 251 with thermal expansion coefficient, which is different from the thermal expansion coefficient of the test fiber 253 material, is attached to one Bragg grating 257 from double-Bragg grating element (FIG. 11).

Figure 12:
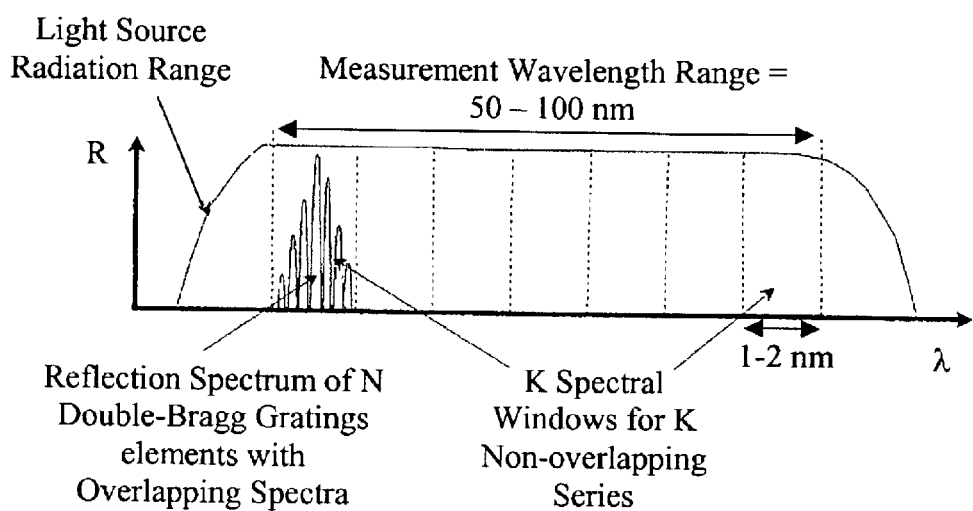
FIG. 12 presents the reflection spectrum of for embodiment where each double-Bragg grating element with the unique distance comprises series of K double-Bragg grating elements.

With this invention, we can localize the perturbation with an accuracy equal to the distance between two neighboring double-Bragg grating elements. Therefore, in order to increase the resolution, the number of double-Bragg grating elements must be increased. In order to increase the number of elements, K "nonoverlapping" series consisting of N double-Bragg grating elements with overlapping spectra can be used. FIG. 12 presents the reflection spectrum for the next embodiment of the current invention, which comprises a series of K double-Bragg grating elements positioned along the test fiber. The plurality of double-Bragg grating elements can be manufactured as sets of series of weak double-Bragg grating with the peak reflectivity about 1%. Each series comprises of N double-Bragg gratings with overlapping spectra; gratings from different series have nonoverlapping spectra. This embodiment of the invention allows for an increase in the number of the point sensors by using additional spectral channels. The light source should have a broadband radiation range that exceeds or is equal to the measurement wavelength range.

Figure 13:
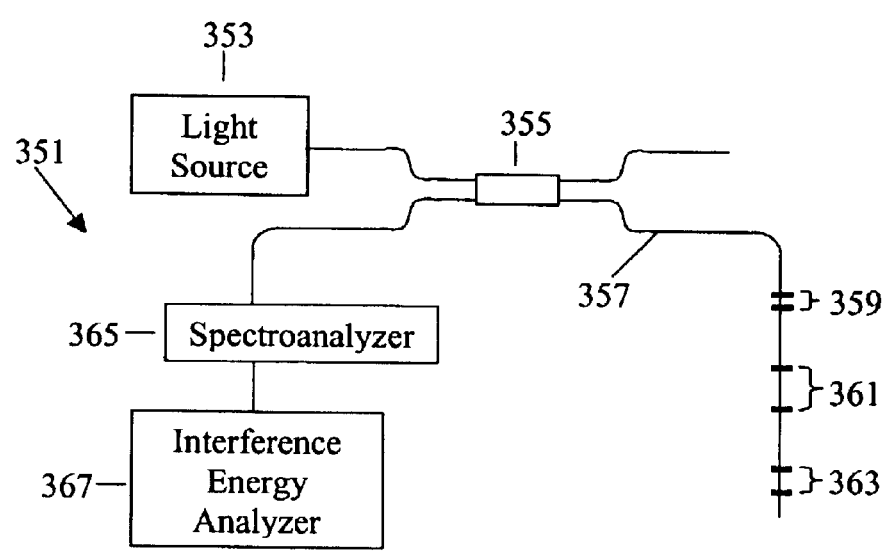
FIG. 13 shows the embodiment of current invention where the optical filter is replaced by a spectroanalyzer.

FIG. 13 shows the next embodiment 351 of the current invention where the optical filter and optical reflection detector are replaced by a spectroanalyzer 365. This system includes a broadband light source 353 that directs a broadband spectral profile through an optical coupler 355, and into a test fiber 357 that contains a number of double-Bragg grating elements 359, 361, and 363. The spectral peaks reflected from the double-Bragg grating elements 359, 361, and 363 travel back through the coupler 355 and into a spectroanalyzer 365. With this embodiment, the interference pattern is detected by a spectroanalyzer 365 and is then processed using an interference energy analyzer 367.

Figure 14:
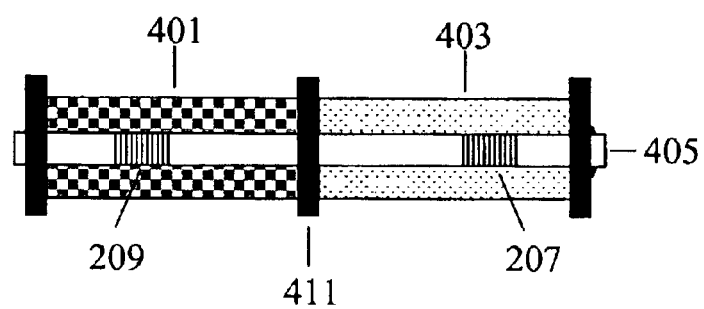
FIG. 14 is a front elevation view of sensitive element of the chemical sensor.

A double-Bragg grating element that detects hydrocarbon is shown in FIG. 14. For this purpose, two Bragg gratings 207 and 209 from each double-Bragg grating element are mechanically coupled to two absorber/expanders members 401 and 403, each having a different swelling efficiency with absorption of chemical agent. When the sensing system is used to sense the presence of hydrocarbons or its vapors, absorber/expander members 401 and 403 may be made from white butyl rubber or red silicone rubber. Various other materials and forms of rubber can be utilized with the present invention. The material selected for the sensor absorber/expander member should exhibit a noticeable swelling coefficient of expansion under a liquid or vapor hydrocarbons influence, resist water, and provide good reversibility under multiply dry-wet cycles.

The fiber sections of the double Bragg grating element with imprinted in the fiber core Bragg gratings are placed, for example, within cylinders of white butyl rubber 401 and red silicone rubber 403. The polymer members swell under hydrocarbon influence and effect on the fiber through a couple of metallic plates-anchors 411 attached to the fiber on both sides of the Bragg gratings. Because of the fiber elongation, the Bragg wavelengths of both gratings shift to longer wavelength in hydrocarbon presence, but at different values. The different extension of two gratings from one double-Bragg grating element producing the change of normalized energy of the modulation signal at certain frequency, which is inherent for this element. The same result can be achieved if we attached absorber/expander member only to one Bragg grating from every elements, or if we attached two identical absorber/expander members to both Bragg gratings, but protect one of them from chemical agent influence.

Figure 15:
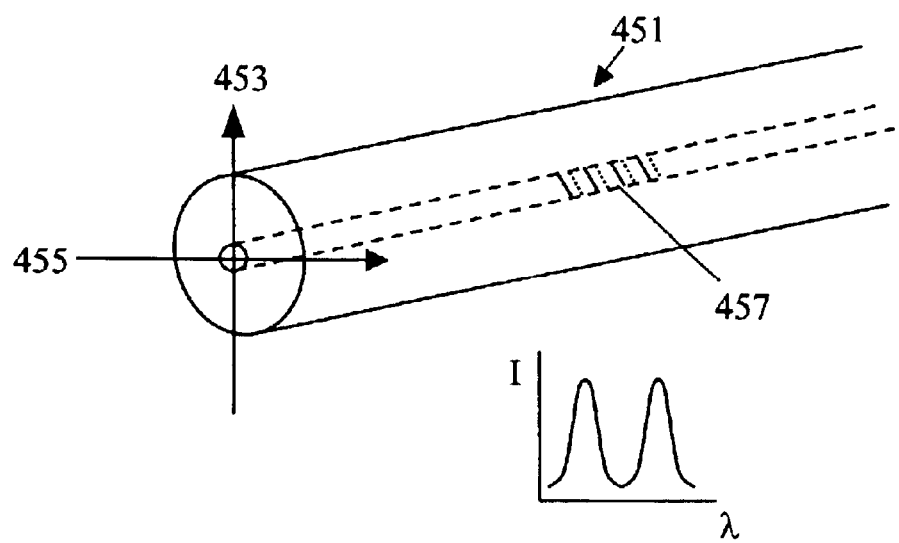
FIG. 15 is a diagram of a fiber grating written into birefringent optical fiber.

FIG. 15 shows a prior art fiber grating strain sensor configured so that transverse strain may be measured. A birefringent optical fiber 451 has two orthogonal polarization axes 453 and 455. When a fiber grating 457 is written onto the optical fiber 451 two effective fiber gratings result along of the polarization axes 453 and 455. When a transverse force is applied along the axes 453 and 454 in the vicinity of the fiber grating 457 the spectral separation between the two effective fiber gratings shift and provides a means to measure transverse strain. Greater details on this type of fiber grating sensor can be found in U.S. Pat. Nos. 5,591,995, 5,869,835 and 5,828,959 all by Eric Udd.

Figure 16:
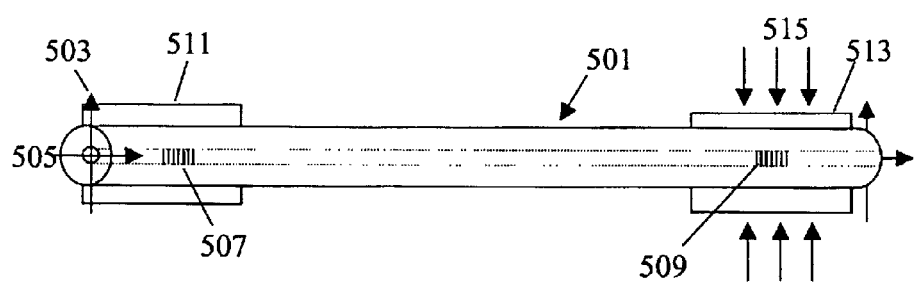
FIG. 16 shows a matched pair of fiber gratings written into birefringent optical fiber and configured to measure transverse strain using the present invention.

FIG. 16 illustrates how the present invention may be used to read out transverse strain from the type of fiber grating strain sensor shown in FIG. 15 while reducing temperature sensitivity. A birefringent optical fiber 501 with the polarization axes 503 and 505 has two wavelength matched fiber gratings 507 and 509 written into it. The mounting 511 on one end of the birefringnet optical fiber 501 in the vicinity of the fiber grating 507 is designed to decouple strain so that temperature is the primary mechanism for wavelength shifts. The mounting 513 is designed to couple one or more strain effects into the vicinity of the fiber grating 509. As an example the transverse force 515 along the polarization axis 503 of the fiber grating 509 will result in a spectral shift, which will mismatch with the corresponding fiber grating 507 along the polarization axis 503. This mismatch can in turn be used to measure transverse strain in a manner directly analogous to that used above in association with the earlier Figures. In certain cases it may be highly desirable to interrogate only one of the polarization axes at a time. Adding a polarizer and controller in front the light source so that only one of the polarization axes 503 and 505 is illuminated at one time can do this. This procedure is described fully in U.S. Pat. No. 6,363,180 by Yamate et. al.

There have been described and illustrated herein several methods and apparatus for enhancing the accuracy of fiber grating sensor measurements of temperature and strain. It is believed that the methods and apparatus of the invention can be useful with any type of fiber optic sensor. While particular embodiments of the invention have been described, it is not intended that the invention be limited thereto, as it is intended that the invention be as broad in scope as the art will allow and that the specification be read likewise. It will therefore be appreciated by those skilled in the art that yet other modification could be made to the provided invention without deviating from its spirit and scope as so claimed:

What is claimed is:

1. A differential fiber optical sensor, comprising:
   a test fiber with a plurality of double-fiber grating elements positioned along the test fiber, all fiber gratings having overlapping reflection spectra, and each said double-fiber grating element consist of two fiber gratings, separated by a unique distance inherent for this element only,
   a light source to radiate light inside a measurement wavelength range, said light source producing a beam of light propagating along test fiber;
   an optical filter connected to the light source having possibility to change its central transmission wavelength inside said measurement wavelength range, the output radiation of said optical filter having a coherence length, which exceeds distance between Bragg gratings in any one element;
   a fiber optic beamsplitter having a first port connected to the optical filter, a fourth port connected to te test fiber, so as beam of light emitted by broadband light source and passed through optical filter is launched in test fiber, and a second and a third ports;
   an optical reflection detector to receive the light flux, connected to the second port of optic beamsplitter so as to detect the reflected from the test fiber light flux, the said reflection detector being operable to sense changes in the intensity of the reflected from the test fiber light flux inside the measurement wavelength range,
   an interference energy analyzer connected to reflection detector, said interference energy analyzer calculate the energies of the interference patterns separately for each double-Bragg grating element, interference patterns are created by beams reflected from double-Bragg grating elements.

2. The sensor as defined in claim 1 wherein, said light source and said optical filter together comprises a tunable laser which operate at said central transmission wavelength, and output radiation of said tunable laser having a coherence length, which exceeds distance between Bragg gratings in any one element; said tunable laser connected to the first port of beamsplitter.

3. The sensor as defined in claim 1 wherein, said optical filter connected to the second port of beamsplitter and to the reflection detector.

4. The sensor as defined in claim 1 wherein, said optical filter connected to the fourth port of beamsplitter and to the test fiber.

5. The sensor as defined in claim 1 wherein, said optical filter comprises an unbalanced interferometer, having possibility to change the value of optical path difference between its two arms from the value which is less than minimum optical distance between two gratings in one said double-Bragg grating element to the value which is more than maximum one, and said interference energy analyzer calculate the energies of the interference patterns, separately for each double-Bragg grating element, said interference patterns are created by beams reflected from double-Bragg grating element with the change of said optical length difference between two arms of said unbalanced interferometer.

6. The sensor as defined in claim 1 wherein, in order to linearize the sensor response and overcome the sign ambiguity of measurand the Bragg wavelength of one grating from each double-Bragg grating elements is shifted in respect to another one, so as the start point of the measurement is placed in the center of linear length of the dependence of energy of the interference pattern on measurand.

7. The sensor as defined in claim 1 wherein, in order to measure absolute value of temperature one Bragg grating from each said double-Bragg grating elements is mechanically coupled to a bulk sample with thermal expansion coefficient which is differ from the thermal expansion coefficient of the test fiber.

8. The sensor as defined in claim 1 wherein, in order to measure absolute value of temperature two Bragg gratings from each said double-Bragg grating elements are mechanically coupled to a two bulk samples with different thermal expansion coefficients, correspondingly.

9. The sensor as defined in claim 1 wherein, in order to measure absolute value of strain one Bragg grating from each said double-Bragg grating elements is mechanically coupled to a bulk sample, the strain-response of said bulk sample under applied longitudinal force is differ from the strain-response of the test fiber.

10. The sensor as defined in claim 1 wherein in order to measure absolute value of strain two Bragg gratings from each said double-Bragg grating elements are mechanically coupled to a two bulk samples with different strain-response under applied longitudinal force, correspondingly.

11. The sensor as defined in claim 1 wherein, in order to detect the presence of a chemical agent, one Bragg gratings from each said double-Bragg grating elements is mechanically coupled to a absorber/expander member, which is swelling with absorption of said chemical agent.

12. The sensor as defined in claim 1 wherein, in order to detect the presence of a chemical agent, two Bragg gratings from each said double-Bragg grating elements are mechanically coupled to a two absorber/expanders members having different swelling efficiency with absorption of said chemical agent, correspondingly.

13. The sensor as defined in claim 1 wherein in order to increase the spatial resolution by means of increasing of the number of double-Bragg grating elements each double-Bragg grating element with an unique distance, which is inherent for this element comprises series of double-Bragg grating elements positioned along the test fiber with different Bragg wavelengths and nonoverlaping spectra for different elements in this series.

14. The sensor as defined in claim 3 wherein, said optical filter and said reflection detector together comprises a spectroanalyzer.

15. The sensor as defined in claim 5 wherein in order to measure a temperature free from the strain influence, said two bulk samples having the same strain-response under applied longitudinal force.

16. The sensor as defined in claim 7 wherein in order to measure a strain free from the temperature influence, said bulk sample had made from the material with the thermal expansion coefficients equal to the thermal expansion coefficient of the test fiber.

17. The sensor as defined in claim 8 wherein in order to measure a strain free from the temperature influence, said two bulk samples had made from the materials with the same thermal expansion coefficients.

18. The system as in claim 1:

Where at least one of the double-fiber grating sensors are written onto birefringent optical fiber.

19. The system as in claim 1:

Where at least one of the double-fiber gratings are written onto birefringent fiber and one of said fiber gratings being mounted to minimize strain induced effects and the other end mounted to enhance strain induced effects.

20. The fiber sensor as defined in claim 19: where one mounting end is configured to measure transverse strain.

* * * * *